Dec. 4, 1951  J. C. WILLIAMS  2,577,391
VALVE
Filed Aug. 23, 1945
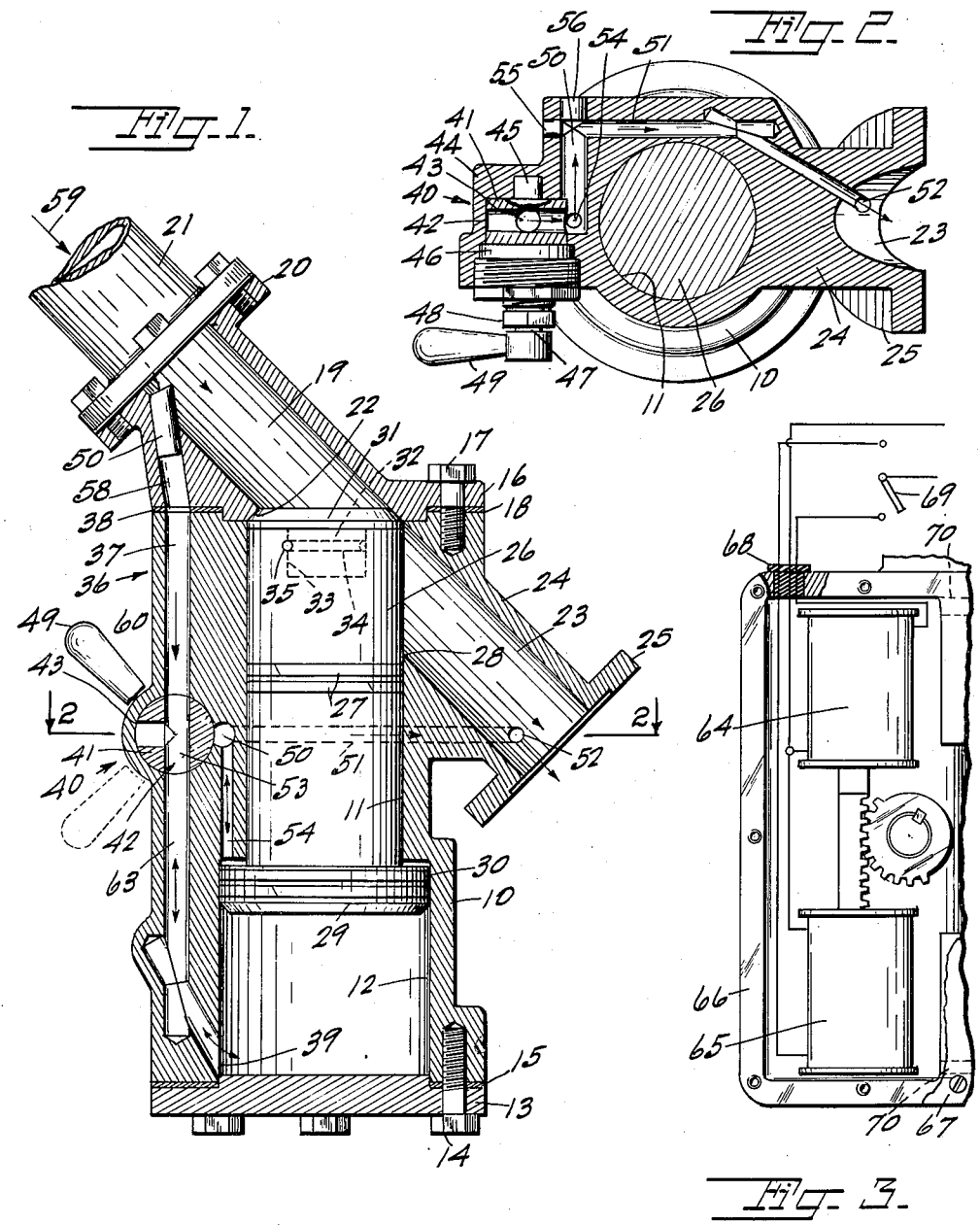
Inventor
John C. Williams
By Philip A. Friedell
Attorney Patented Dec. 4, 1951

2,577,391

UNITED STATES PATENT OFFICE 2,577,391

VALVE

John C. Williams, Oakland, Calif.

Application August 23, 1945, Serial No. 612,176

5 Claims. (Cl. 137—139)

This invention, a valve, is an improvement over conventional valves in that it is operated by the fluid the flow of which the valve controls. No manual or other extraneous effort can be applied to, or is required for operation of the valve, and its control is of the utmost simplicity and ease of operation. The valve is extremely simple in construction and has only one moving part besides the control which is a simple three-way valve which can be manually controlled either directly or remotely.

The valve is devoid of springs, diaphragms, or other elements which can cause trouble and essentially consists simply of a cylinder and a piston, both of which can be formed of any suitable type of material, such as metals or plastics, to handle the specific type of fluid to be controlled. By the use of non-corrosive materials such as stainless steel, bronzes, and the like, acids and alkalies can be controlled, and by the use of suitable metals selected for relative coefficients of expansion, steam, hot oil, and other fluids can be successfully controlled. The valve is therefore applicable to any and all types of fluids.

The objects and advantages of the invention are as follows:

First, to provide a self-operating valve, one which is inaccessible for extraneous application of power so that the valve is hermetically sealed in the flow line and therefore free of packing glands and the like.

Second, to provide a valve in which the power for operation is derived from the fluid to be controlled as to flow.

Third, to provide a valve which is differentially subjected to the existent pressures in the flow line on the respective ends of the valve for actuation thereof.

Fourth, to provide a valve for controlling the flow of fluid through a flow line, which is actuated by the existent pressure in the high pressure side of the line, for both, opening and closing.

Fifth, to provide a valve hermetically sealed in a flow line which requires no external source of power for operation and which is operated solely through the existent pressures in the line.

Sixth, to provide a valve operable through existent pressures in a flow line, and which valve is completely sealed in the line, and which requires only a miniature bypass valve for its control.

Seventh, to provide a valve which is of the utmost simplicity in construction, arrangement and number of parts and therefore virtually trouble-proof.

Eighth, to provide a valve of the simplest possible construction and consisting only of a cylinder and a piston, with connections for the flow line, and a relatively small by-pass valve for control thereof, with all power for operation being derived from the existent pressure of the fluid in the flow line, either or both, static and/or dynamic.

In describing the invention, reference will be made to the accompanying drawings, in which:

Fig. 1 is a vertical section through the invention.

Fig. 2 is a section taken on line 2—2 of Fig. 1.

Fig. 3 illustrates a method of providing a hermetically sealed valve.

The invention consists essentially of a valve body having a flow line passing therethrough and having a diagonal valve seat, and a valve having a bottom area greater than its face and with the valve face completely blocking the flow line when seated on the valve seat, and a manually controlled bypass from the flow line to the bottom of the valve for urging the valve to close against the pressure on its face, and to open with that pressure when bypassing is terminated.

As illustrated in Figs. 1 and 2, the flow line is shown diagonal for more clearly illustrating the invention, though the flow line may be horizontal, vertical, or diagonal, and the invention can be in any position, extend upward or downward, or project to either side, since the relative position of the valve can have no effect on its operation or accessibility. It can also be formed to function as an angle coupling.

The cylinder 10 is of the differential type, having a main bore 11 terminating at the lower end in a counterbore 12, and is provided with a bottom cover plate 13 which is secured in position by cap screws 14 with interposed gasket 15 which can be dispensed with where relatively low pressures are controlled or if a precision fitting job is provided.

A cap 16 is suitably fitted to the top of the cylinder and secured by means of cap screws 17 with interposed gasket 18 (if required).

Diagonally formed through the head 16 is a supply passage 19 terminating at its upper end in a flange 20 for connection of the flow line 21, the flange to be replaced by a pipe thread for threaded couplings, and terminating at its lower end in a valve seat 22 formed in axial alignment with the cylinder when the head is in place, and an outlet passage 23 is formed in the diagonal projection 24 from the side of the cylinder and in axial alignment with the passage 19. This outlet passage is similarly provided with flow line connecting means such as the flange 25.

Operating in the cylinder is a stepped piston, one end 26 of which slidably operates in the bore 11 and is provided with suitable sealing means such as the packing rings 27 located below the juncture 28 of the bottom of the passage 23 and the bore 11 of the cylinder, the other, or enlarged end 29 of the piston operating in the counterbore and also being supplied with suitable sealing means such as the packing or piston rings 30. A valve head 31 may be formed directly on the upper end of the piston, but is preferably separately formed and floatably mounted for accurate seating, and to permit replacement in case of wear or scouring, and is illustrated as consisting of the valve head 31 with integral valve stem 32 somewhat freely fitting in a bore 33 and having an annular groove 34 and secured in position by suitable means such as a dog-point headless set screw, or as shown, by means of a tangent pin 35.

Formed in the wall on the pressure side 36 of the cylinder is a bypass 37 which extends from the top of the wall at 38 to the bottom of the cylinder counterbore at 39, and interposed in this bypass and shown mounted in the cylinder wall is a three-way valve 40 which may be of any conventional type and of relatively small size, and is illustrated as consisting of a valve plug 41 having a diametric passage 42 and an intercommunicating branch passage 43 and pivoted at one end in the housing 44 as indicated at 45, with the housing sealed by the plug 46 and which simultaneously functions as a bearing for the shaft 47 and which is shown as packed by the packing gland 48 and having a handle 49 for manual operation of the bypass valve. Although the valve and bypass are illustrated as formed as a part of the cylinder, this bypass can be provided through pipe or tubing, with the valve interposed therein, the structure shown being unitary and requiring no after assembly or fitting.

A discharge passage for the lower end of the cylinder is formed within the walls of the cylinder as indicated at 50, 51, and 52 and extending from a point of communication with the third or lateral passage 53 in the valve plug, to the outlet passage 23 or low-pressure side of the flow line, and a breather passage 54 extends from the top of the enlarged portion of the cylinder into the passage 50, the ends of the passages 50 and 51 being plugged as indicated at 55 and 56. A continuing passage for the bypass is formed in the head as indicated at 57, in direct communication with the bypass 37 and opens into the high-pressure side or supply passage of the flow line. If the flow of fluid is relatively slow, the open passage will prove satisfactory, but if the flow is relatively rapid, a Pitot tube 58 may prove beneficial for utilizing the dynamic energy of the flow to counteract the impact on the valve head, for closing the valve, and for more rapid closing of the valve.

The operation of the invention is as follows: With the flow of fluid in the direction of the arrow 59 and the bypass valve lever 49 in the position shown, the bypass valve is open and the pressure of the fluid in the passage 19 is transmitted to the bottom of the cylinder urging the piston upward and the valve 31 against its seat 22, sealing the flow line against passage of fluid, therefore no fluid can flow through the outlet 23.

By moving the lever 49 to its other position, the plug 41 seals the bypass at 60 and the branch 53 communicates with the passage 50, while passage 43 communicates with the lower portion 63 of the bypass. This immediately relieves the pressure on the bottom of the piston, the pressure of the fluid in the passage 19 acts on the valve head and forces the piston down with the fluid in the lower end of the cylinder passing through 39, 63, 43, 53, 50, 51 and 52 into the outlet passage 23, and simultaneously any fluid which may have accumulated on top of the enlarged portion of the piston is forced out through the bleeder passage 54 into passage 50, the fluid acting on top of the valve forcing the piston down, and as soon as the flow has started, the energy being augmented by the suction created by the flow past opening 52, rapidly opening the valve, though not sufficiently rapid to cause any impact, the movements being at all times cushioned and providing a smooothly operating and shock-free valve.

When the bypass valve is returned to the position shown, the passage 63, 37 is again completed and passage 50 is closed off, the combined dynamic and static heads in the pipe 21 act through the passage 37, 63, on the enlarged face 29 of the piston, against the pressure exerted on the head of the valve, forcing the piston upward to its seat, efficiently sealing the flow line against passage of fluid.

It will be noted that the valve 40 can be operated from any remote point, through wires or cords, or by means of a solenoid, and can even be made as a completely sealed unit, free of any possibility of leakage and free of packing, as illustrated in Fig. 3, in which the lever 49 is controlled by opposed solenoids 64 and 65 mounted in a housing 66 formed integrally with the cylinder and provided with a sealed cover plate 67 with the electrical connections sealed in a sealed-in bushing 68, with a switch 69 selectively controlling the two solenoids, though a spring can be substituted for one of the solenoids to normally retain the valve lever in one position. With this arrangement the seal of the valve is as complete as that of the line, and is to be used where a perfect seal is essential, as in connection with obnoxious or deleterious gases and liquids. A bypass 70 constantly drains any accumulated fluids to the passage 50.

Obviously, the structure of the valve can be modified in several ways. The head 16 can be made integral with the cylinder and thereby eliminate the connection of the head to the cylinder. The flow line is illustrated at an angle of 45° and without any change in the direction of flow, but this angle can be varied, though 45° provides the best balance between diameter of valve and required movement of piston, for a straight flow line. The supply portion 19 of the flow line can be coaxial with the cylinder, extending straight up, with the discharge portion 23 extending at any angle from the cylinder. Where wastage is unimportant or a drain can be provided, the contained fluid in the counterbored portion of the cylinder can be drained other than to the discharge portion of the flow line, though its connection to the discharge line provides more rapid action of the valve because of the suction created by the fluid when flowing therethrough, which helps to close the valve when the bypass 37—63 is opened. To increase the suction a Pitot tube can be mounted in the passage 52 and inclined in the direction of flow, similar to the tube 58 which is directed against the flow to utilize the dynamic pressure of the flowing fluid for closing the valve.

I claim:

1. A valve comprising; a valve body and a valve head, and means for securing and sealing said valve head to one end of the valve body, and a cover and securing and sealing means therefor for the other end of said body; a stepped bore formed through said valve body with the minor diameter bore opening through said one end, a conical valve seat formed in said head, in axial registry with said stepped bore, and a first bore formed through said head at an angle of 45 degrees to the axis of said valve seat, a second bore formed through one side of said body in axial alignment with said first bore, the diagonal bore in said head having its periphery terminating coincident with the bottom periphery of the valve seat at two opposite points, and the diagonal bore in the body having one peripheral edge coincident with the intersection of the minor diameter bore with the one end of the body and coincident with one edge of the valve seat; a stepped piston slidable in said stepped bore and having a valve formed on its terminal end for seating in said valve seat; a high pressure bypass extending from said first bore in said valve head to the head end of the major bore of said stepped bore in said body; a low pressure bypass extending from said high pressure bypass to said second bore, and a manually controlled three way valve located at the intersection of said high pressure and low pressure bypasses, and a breather passage communicating between said low pressure bypass and the bottom of the major bore, whereby high pressure fluid in said first bore acts directly on said valve to urge the valve to open, and simultaneously on the enlarged end of the piston through said high pressure bypass to the head end of said major diameter bore to maintain the valve closed against the urgence of the high pressure fluid on said valve when said three way valve is in one position, and fluid drains from said major diameter bore to said second bore with the high pressure fluid acting on said valve to force said valve to open when the three way valve is in another position, and said breather passage being in constant communication between said second bore and the bottom of the major diameter bore, permits unrestricted movement of said piston for opening and closing said valve.

2. A structure as defined in claim 1; a tube fixed in said high pressure bypass and projecting into the diagonal bore in said head in intercepting relation to the flow of fluid when said valve is open to expedite delivery of fluid to the head end of the major bore for prompt response in closing said valve.

3. A structure as defined in claim 1; the valve end of said piston having an axial stem receiving bore; said valve having a stem freely fitting in said stem receiving bore for radial movement to a slight degree in any direction and having an annular groove, and a tangent pin fixed in said piston and passing within said groove for retaining the valve stem against axial movement while permitting radial and rotational movement for accurate seating on said valve seat.

4. A flow-line-pressure controlled valve comprising, a flow line having an entrance end and a discharge end and having a conical seat formed therein at an angle of 45 degrees to the axis of the flow line and spanning the flow line for unrestricted passage of fluid, a stepped cylinder in axial alignment with said valve seat, and having a head and sealing means therefor at one end and with the other end of minor diameter terminating at the valve seat, a stepped piston having a head end, an intermediate shoulder and a valve end for cooperation with said valve seat, a first bypass communicating between the head end of said cylinder and the entrance end of said flow line; a second bypass communicating between said first bypass and the discharge end of said flow line, and a three-way valve located at the intersection of said first and second bypasses, a bleeder passage communicating between said second bypass and the lower end of the enlarged portion of said cylinder; said three-way valve when in one position bypassing fluid from the entrance end of said flow line to the head end of said cylinder to close said valve end to said seat against the urgence of the fluid under pressure in the flow line, and when in the other position draining the fluid from the head end of said cylinder to the discharge end of said flow line, with said breather passage permitting unrestricted movement of said piston in either direction.

5. A structure as defined in claim 4; the valve end of said piston having an axial stem receiving bore; said valve having a stem freely fitting in said stem receiving bore for radial movement to a slight degree in any direction and having an annular groove, and a tangent pin fixed in said piston and passing within said groove for retaining the valve stem against axial movement while permitting radial and rotational movement for accurate seating on said valve seat.

JOHN C. WILLIAMS.

REFERENCES CITED

The following references are of record in the file of this patent:

UNITED STATES PATENTS

| Number | Name | Date |
|---|---|---|
| 570,727 | Gale | Nov. 3, 1896 |
| 705,091 | Joule | July 22, 1902 |
| 1,170,727 | Baker | Feb. 8, 1916 |
| 1,960,284 | White | May 29, 1934 |
| 1,999,493 | White | Apr. 30, 1935 |

FOREIGN PATENTS

| Number | Country | Date |
|---|---|---|
| 1,755 | Great Britain | of 1868 |
| 9,154 | Great Britain | of 1888 |
| 18,584 | Great Britain | Sept. 14, 1899 |